US00RE38666E

(19) United States
(12) Reissued Patent
Orolin

(10) Patent Number: US RE38,666 E
(45) Date of Reissued Patent: Dec. 7, 2004

(54) GAME MATERIAL SET AND PLAY METHOD WITH MONEY-MATCH BONUS LEVEL QUALIFIER

(75) Inventor: Scott A. Orolin, Altoona, PA (US)

(73) Assignee: Universal Manufacturing Company, Inc., Kansas City, MO (US)

(21) Appl. No.: 09/921,736

(22) Filed: Aug. 3, 2001

Related U.S. Patent Documents

Reissue of:
(64) Patent No.: 5,931,468
Issued: Aug. 3, 1999
Appl. No.: 09/055,146
Filed: Apr. 3, 1998

(51) Int. Cl.[7] ..... A63F 3/06
(52) U.S. Cl. ..... 273/139; 273/138.1; 283/901; 283/903
(58) Field of Search ..... 273/139, 138.1; 283/903, 901, 105, 103, 100, 98

(56) References Cited

U.S. PATENT DOCUMENTS

| | | | | | |
|---|---|---|---|---|---|
| 3,300,219 | A | * | 1/1967 | D'Amato et al. | 273/139 |
| 4,033,611 | A | * | 7/1977 | Johnsen | 273/139 |
| 4,740,016 | A | * | 4/1988 | Konecny et al. | 283/903 |
| 4,943,090 | A | * | 7/1990 | Fienberg | 273/139 |
| 5,046,737 | A | * | 9/1991 | Fienberg | 273/139 |
| 5,092,598 | A | * | 3/1992 | Kamille | 273/139 |
| 5,158,293 | A | * | 10/1992 | Mullins | 273/139 |
| 5,193,815 | A | * | 3/1993 | Pollard | 273/269 |
| 5,407,200 | A | * | 4/1995 | Zalabak | 273/139 |
| 5,671,921 | A | * | 9/1997 | Quinlan | 273/139 |
| 5,743,524 | A | * | 4/1998 | Nannicola | 273/139 |

OTHER PUBLICATIONS

"Banker's Club", Douglas Press, Inc. brocure, 1987.*
"Bank 200/250", Douglas Press, Inc. brochure, 1989.*

* cited by examiner

*Primary Examiner*—Benjamin H. Layno
(74) *Attorney, Agent, or Firm*—Jenner & Block LLP

(57) ABSTRACT

A game material set is provided for playing a game of chance for monetary prizes and includes a plurality of individual playing cards each having one or more groups of game symbols printed thereon and selectively concealed under break-open windows. The game symbol groups provide a first level of game play whereby players with winning game symbol groups can receive instant prize awards. A master game card is provided which includes a sign-up area for players having contingent money-match bonus prize qualifier symbols printed on their individual play cards. A master card window selectively conceals a winning bonus prize symbol list comprising a subset of the contingent money-match bonus prize qualifier symbols. Opening the master game card window to expose the winning bonus prize symbol list identifies the players who receive prizes in the bonus level of play. A game play method includes the steps of playing a first game level with individual playing cards and playing a bonus game level with a master game card having a money-match bonus prize list printed thereon and selectively concealed under a break-open window.

14 Claims, 4 Drawing Sheets

GAME MATERIAL SET AND PLAY METHOD WITH MONEY-MATCH BONUS LEVEL QUALIFIER

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to game material sets for playing games of chance for monetary prizes, and in particular to a game material set and play method for playing a game of chance involving multiple play levels utilizing individual game cards with concealed symbols and a master game card for identifying bonus level winners from holders of money-match qualifiers.

2. Description of the Prior Art

Games of chance comprise a popular form of entertainment and include a wide variety of different game materials and game play methods. Monetary prizes tend to stimulate interest among many players who thus have a stake in the outcome. A common use of game materials for playing games of chance is for fund-raising purposes. Many social, fraternal, charitable and other organizations conduct games of chance for monetary prizes in order to raise funds. The structure of such games is regulated in many locations. For example, the ticket count and the minimum payout percentage, which effect the operator's profit, are specified by applicable gaming regulations in many jurisdictions.

Game materials are typically designed to promote sales by stimulating player interest and excitement. Accordingly, game manufacturers tend to develop new game materials and play actions which maximize player involvement and interest. For example, promotional graphics printed on the game materials and play action techniques such as cumulative awards and bonus levels of play are used to stimulate player interest. A game can provide an initial level of play in which players receive instant awards for game materials (e.g., cards and tickets) with predetermined winning symbol combinations. Such materials can provide for an additional level or levels of bonus play, with opportunities to win a grand prize consisting of a monetary sum or some other prize.

A typical multi-level game action involves identifying in a first "instant award" level of play a subset of players who are qualified for bonus play. The qualified players then engage in a second or bonus level of play. Multiple bonus levels of play can be provided for maintaining player interest and enthusiasm.

An example of a game material set with a bonus play level is disclosed in the Quinlan U.S. Pat. No. 5,671,921, which is assigned to a common assignee herewith. Although the game action disclosed therein stimulates player interest in the bonus level of play, it does not include the money-match qualifier feature of the present invention whereby players attempt to match bonus play amounts on their individual play cards with a group of prize amounts concealed under a bonus window on a master game card.

Heretofore there has not been available a game material set and game method for playing a game of chance for monetary prizes with the advantages and features of the present invention.

SUMMARY OF THE INVENTION

In the practice of the present invention, a game material set is provided which includes a plurality of individual playing cards, each having a group of game symbols printed thereon. Some of the playing cards have contingent money-match bonus prize qualifier symbols printed thereon. The symbols are concealed by one or more break-open windows until the cards are played, whereupon the windows are opened to reveal the concealed symbols thereunder. Winning and losing game symbol groups provide a first, instant-winner level of play with the individual play cards.

A bonus level of play is provided by a plurality of contingent money-match bonus prize qualifier symbols 10 printed on the individual playing cards, which qualify the respective card holders to sign up adjacent to their corresponding contingent bonus prize symbols in a sign-up area of a master game card. The bonus level is played by opening a bonus prize symbol window on the master game card to reveal a winning bonus prize symbol list comprising some of the contingent bonus prize symbols whereby the bonus prize winners are identified.

A method of playing a game of chance for monetary prizes includes the steps of opening one or more windows on the individual cards to reveal symbol groups thereunder, whereupon instant winners can receive their prize amounts. Players with contingent money-match bonus prize qualifier symbols printed on their cards are eligible for bonus play and can sign a sign-up list adjacent to their corresponding contingent bonus prize symbols. A window on the master game card is then opened to reveal a list of money-match winning bonus prize symbols comprising a subset of the contingent bonus prize symbols.

OBJECTS AND ADVANTAGES OF THE INVENTION

The principal objects and advantages of the present invention include: providing a game material set for playing a game of chance for monetary prizes; providing such a game material set which provides a first level of play with instant winners and a bonus level of play; providing such a game material set which includes multiple individual playing cards; providing such a game material set which includes groups of game symbols printed on the individual playing cards; providing such a game material set which includes windows on the individual playing cards selectively concealing the game symbol groups printed thereunder; providing such a game material set which includes a plurality of contingent money-match bonus prize qualifier symbols printed on the individual playing cards; providing such a game material set which includes a master game card with a sign-up area for players qualified for bonus play; providing such a game material set which includes a winning, money-match bonus prize symbol list printed on the master game card and selectively concealed by a break-open window; providing a method of playing a game of chance for monetary prizes; and providing a game material set and play method which are efficient in operation, capable of stimulating and maintaining player interest, capable of promoting the sale of the game cards and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

Introduction and Environment

Figure 1:
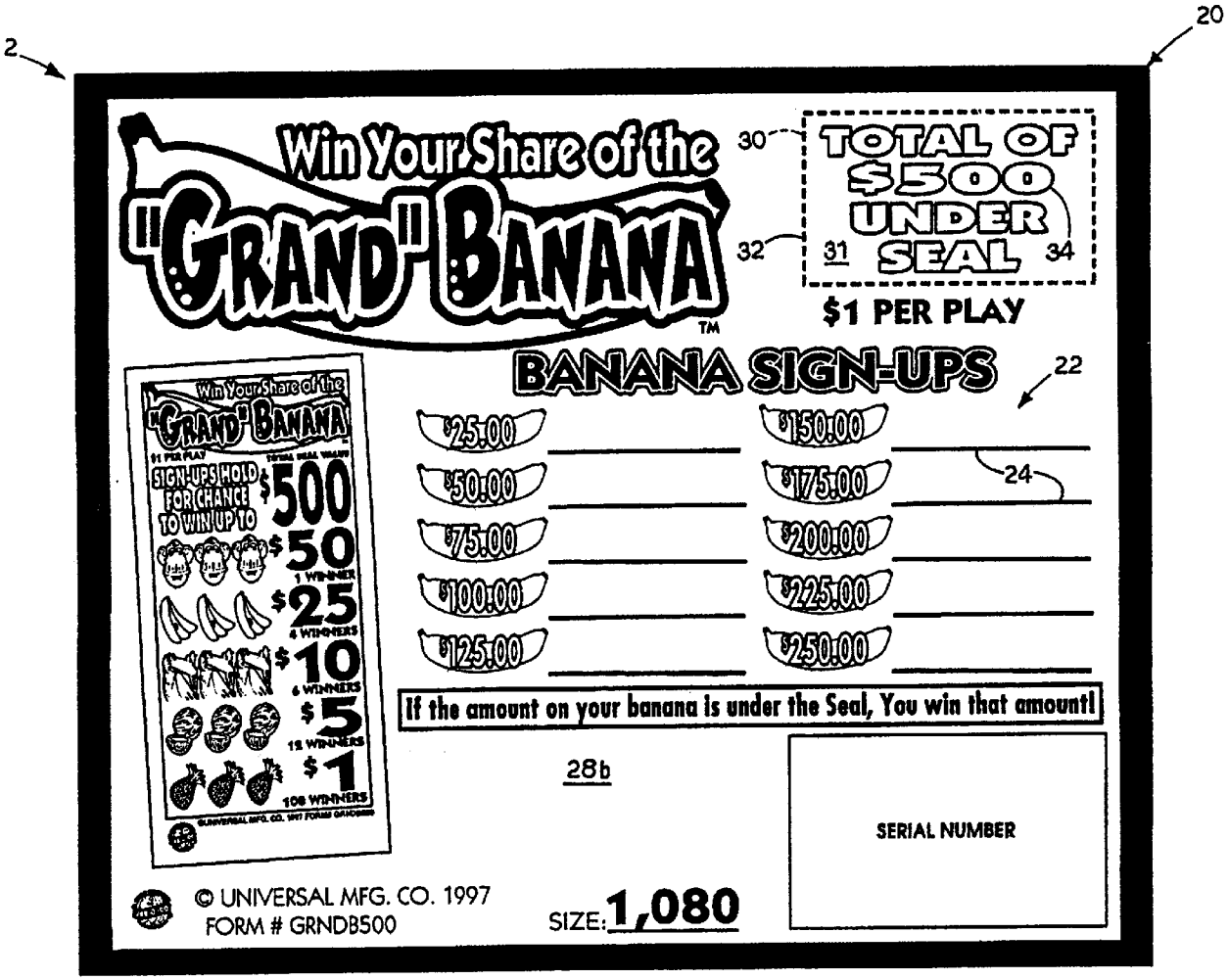
FIG. 1 is a front elevational view of a master game card for a game material set embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 2 generally designates a game material set for playing a game of chance for monetary prizes and embodying the present invention. The game material set 2 includes a predetermined number of individual playing or game cards 4 which are typically sold for a predetermined price each. The product of the price per card 4 and the total number of cards 4 represents the gross income for the game material set 2.

Figure 5:
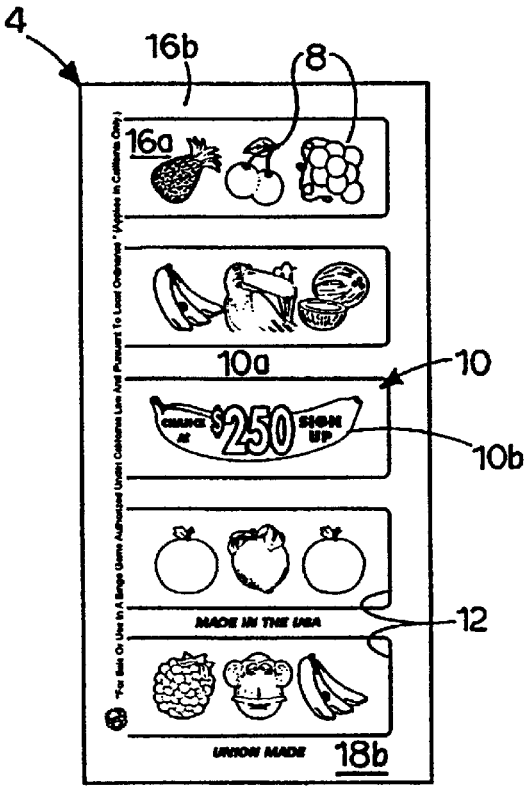
FIG. 5 is a back elevational view of the individual playing card, with the break-open windows thereof opened to reveal the game symbol combinations printed thereon, including a contingent money-match bonus prize qualifier symbol.
Figure 6:
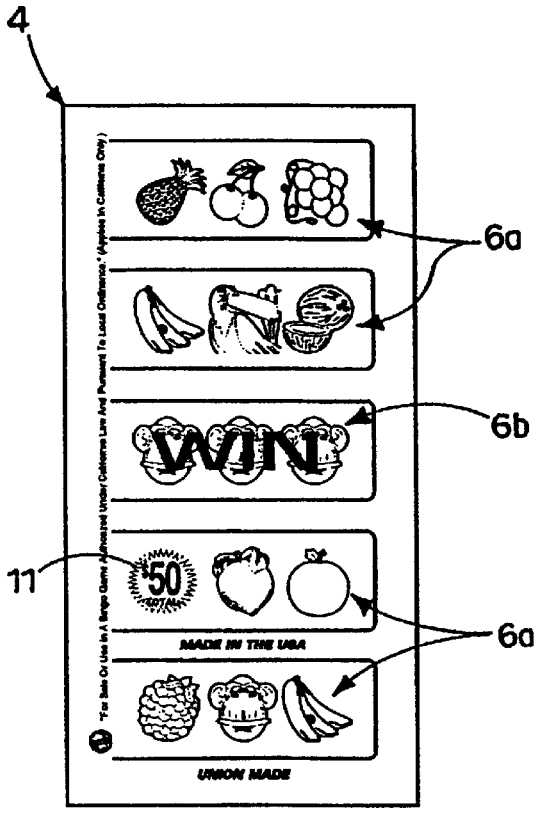
FIG. 6 is a back elevational view of another individual playing card with the break-open windows thereof opened to reveal an instant winner game symbol group printed thereon.

Each individual playing card 4 has printed thereon a plurality of groups 6 of game symbols 8, including "losing" symbol groups 6a and "winning" game symbol groups 6b, e.g., three-of-a-kind, etc. Also included among the individual card game symbols are a plurality of contingent money-match bonus prize qualifier symbols 10. Each symbol 10 includes a contingent bonus prize money-match amount 10a (e.g., $250, FIG. 5) and a bonus play qualifier comprising a contingent bonus prize icon or symbol 10b, such as the banana shown in FIG. 5. Each individual game card 4 includes a plurality of symbol groups 6 and/or bonus prize qualifier symbols 10 printed thereon. For example, in a five-window configuration, various combinations of the symbol groups 6 and/or the bonus prize symbols 10 would be printed on the individual playing cards 4. As shown in FIG. 6, an instant prize total amount 11 can be included within one symbol group 6 on each instant winner card 4 to identify the total instant prize amount to be paid on that particular card.

Figure 2:
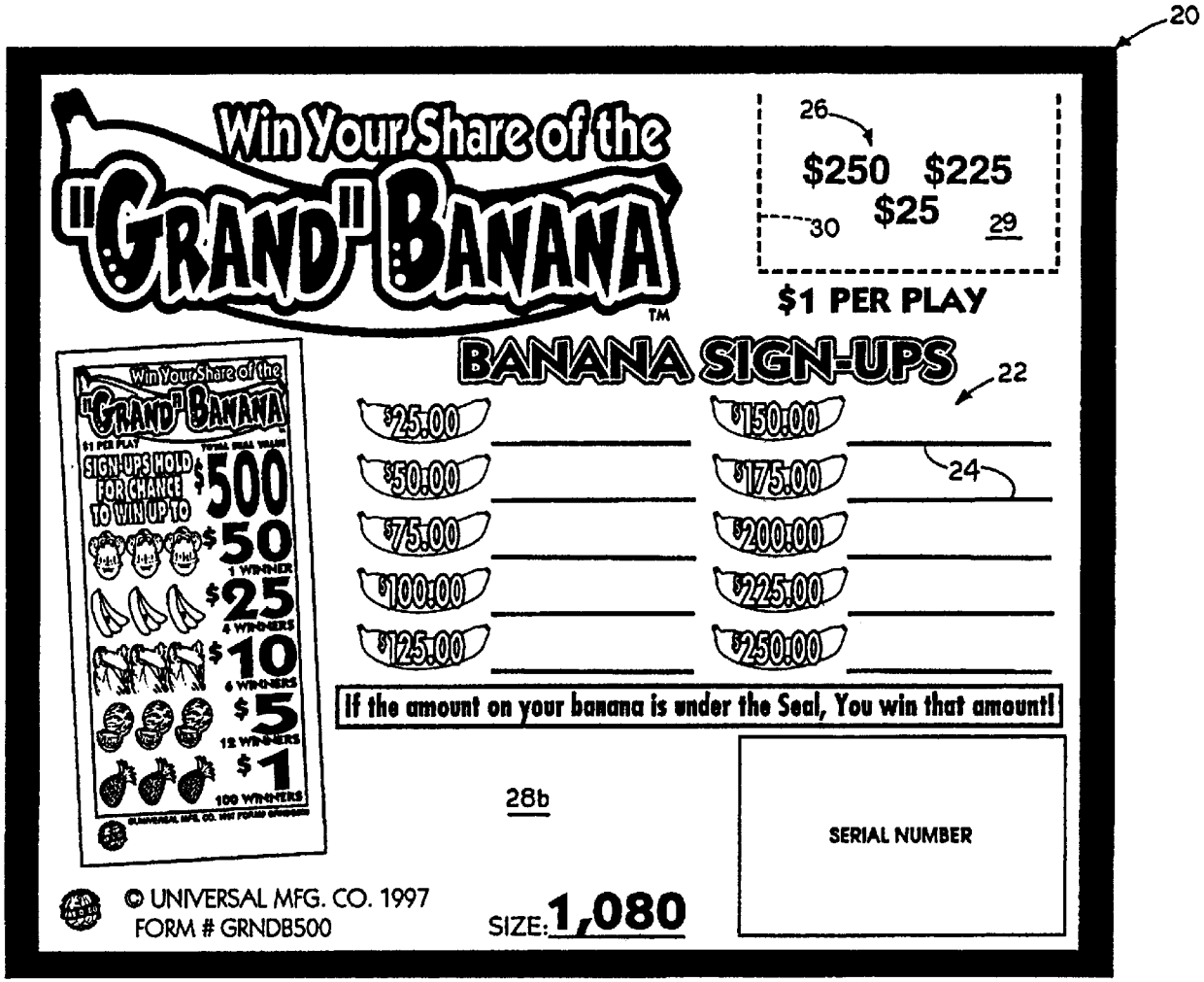
FIG. 2 is a front elevational view of the master game card, with a bonus window thereof opened to reveal a money-match list of winning bonus prize amounts.
Figure 3:
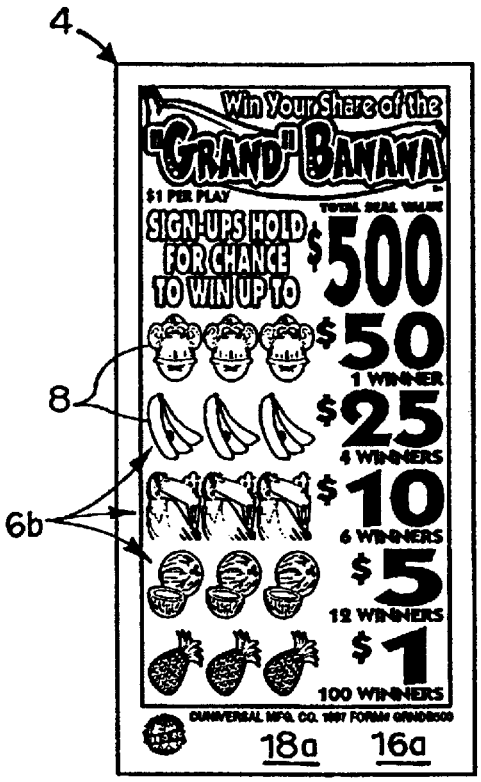
FIG. 3 is a front elevational view of an individual playing card.
Figure 4:
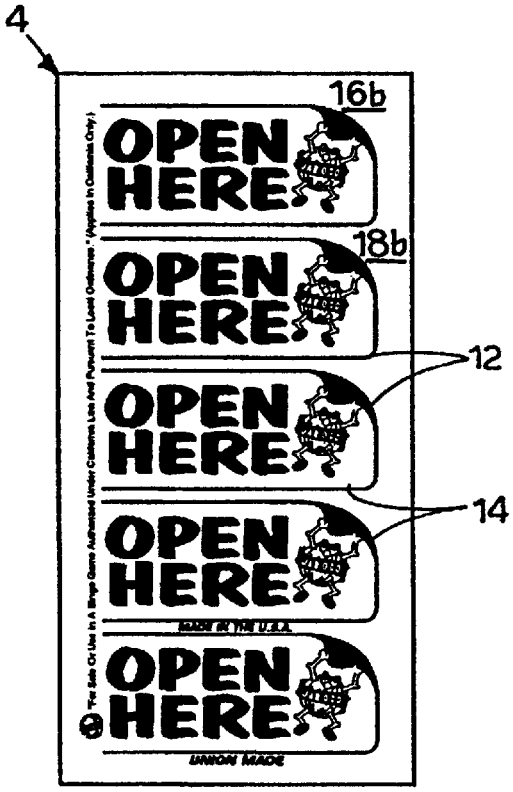
FIG. 4 is a back elevational view of the individual playing card.

The number of winning game symbol groups 8b and the number of bonus prize symbols 10 are predetermined to provide a desired payout amount and profit percentage after the entire game material set 2 has been played. FIG. 2 shows an example of a possible game material set configuration with a total ticket count of 1,080 individual playing cards priced at one dollar each.

Each symbol group 6 and bonus prize symbol 10 printed on a card 4 is covered by a respective break-open window 12 with a closed position concealing the symbol group 6 or the bonus prize symbol 10 and an open position revealing same. The individual play cards 4 can comprise laminated construction consisting of first and second (front and back) layers 16a,b respectively, which can be made of a suitable card stock material. The first and second layers 16a,b include outer faces 18a,b respectively. The first (front) layer 16a has printed on an inside face 17a thereof the game symbol groups 6 and the bonus prize symbols 10 under respective windows 12 which are formed by perforated tear lines 14 in the second (back) layer 16b. The outer faces 18a,b of both layers 16a,b can be printed with game information, decorative art, instructions, security markings, etc.

A master game card 20 includes a sign-up area 22 with the contingent or qualifier bonus prize symbols 10 printed thereon. A plurality of signature lines 24 are also printed in the sign-up area 22, with each line 24 being located adjacent to a respective contingent bonus prize symbol 10. The bonus prize symbols 10 preferably include a range of different amounts, although multiples of the same amounts could also be employed. Each contingent money-match bonus prize qualifier symbol 10 printed on an individual playing card 4 corresponds to a respective signature line 24 and a respective contingent money-match bonus prize qualifier symbol 10 printed on the master game card 20. A winning bonus prize symbol list 26 is printed on the master game card 20 and comprises a subset of all of the contingent bonus prize amounts 10a.

The master game card 20 can be manufactured with layers 28 comprising a base layer 28a having the winning bonus prize symbol list 26 printed on an inside face 29 thereof and a cover layer 28b having a window 30 formed therein by a perforated tear line 32. A cumulative bonus prize amount 34 is printed on an outer face 31 of the window 30 and represents the sum of the amounts 10a represented by the winning bonus prize symbol list 26 concealed under the window 30.

Play Action

The game material set 2 is played by selling the individual playing cards 4, the purchasers of which break open the windows 12 to reveal symbol groups 6 or symbols 10 concealed thereunder. Instant winning symbol groups 6b can be immediately redeemed for the corresponding instant winner prize amounts associated therewith. Players with cards 4 containing contingent bonus prize symbols 10 are qualified to sign the signature lines 24 adjacent to their respective contingent bonus prize symbols 10.

Selling all of the individual playing cards 4 and paying out all of the instant prizes completes level one of game play. Level two of game play comprises a bonus or money-match level of play and involves the participants whose signatures appear on the signature lines 24 in the master game card sign-up area 22. For money-match bonus level play, the window 30 is opened to reveal the winning bonus prize symbol list 26. The players with their names signed up adjacent to the corresponding contingent bonus prize symbols 10 receive these amounts for their successful money matches.

Many different combinations and permutations of the game are possible with the game material set 2. For example, an individual playing card 4 can include both a winning symbol group(s) 6b and a contingent bonus prize symbol(s) 10. A single card 4 can include all of the bonus level winning amounts. Various game symbols 8, such as slot machine symbols, and various contingent bonus prize symbol icons 10b can be employed.

It is to be understood that while certain forms of the present invention have been illustrated and described herein, it is not to be limited to the specific forms of arrangement of parts described and shown.

What is claimed and desired to be secured by Letters Patent is as follows:

1. A game material set for playing a game of chance for monetary prizes, which comprises:

(a) a plurality of individual playing cards each having a group of game symbols printed thereon;

(b) said game symbol groups including at least one winning game symbol group corresponding to an instant prize amount and at least one losing game symbol group, said game symbol groups providing a first play level;

(c) a plurality of bonus level qualifier symbols each including one of a plurality of bonus level money-match prize amounts, a plurality of said individual playing cards each having a respective bonus level qualifier symbol printed thereon;

(d) each said individual playing card having a window with a closed position concealing a respective game symbol group or a respective bonus level qualifier symbol and an open position revealing same; and (e) a master game card including:

(i) a bonus play level sign-up area including said bonus level money-match prize amounts printed thereon and a plurality of signature lines each located adjacent to a respective bonus level money-match prize amount;

(ii) a bonus prize winner list printed on said master game card and comprising a plurality of said bonus level money-match prize amounts;

(iii) a master game card window having a closed position concealing said bonus prize winner list and an open position revealing same; and (iv) a cumulative bonus prize amount printed on the outside of said master game card window, said cumulative bonus prize amount equaling the sum of said bonus level money-match prize amounts on said bonus prize winner list.

2. The game material set according to claim 1, which includes:

(a) said bonus prize winner list comprising a subset of said bonus level money-match prize amounts.

3. The game material set according to claim 1, which includes:

(a) each said individual playing card with a bonus level money-match prize amount printed thereon also having a bonus prize icon printed thereon, said bonus level money-match prize amounts and said bonus prize icons collectively forming said bonus level qualifier symbols.

4. The game material set according to claim 1, which includes:

(a) an instant prize total amount printed on each said individual playing card including a winning symbol group.

5. The game material set according to claim 4 wherein said instant prize total amount is included within a respective game symbol group printed on said individual playing card.

6. A game material set for playing a game of chance for monetary prizes, which comprises:

(a) a plurality of individual playing cards each having a group of game symbols printed thereon;

(b) said game symbol groups including a plurality of winning game symbol groups corresponding to respective instant prize amounts and a plurality of losing game symbol groups, said game symbol groups providing a first play level;

(c) an instant prize total amount printed on each winning playing card and representing the total prize amount represented by said winning symbol groups on said card, each said instant prize total amount being incorporated within a losing game symbol group on said card;

(d) a plurality of bonus level qualifier symbols printed on a plurality of respective cards, each said qualifier symbol including a bonus prize icon and one of a plurality of bonus level money-match prize amounts;

(e) each said individual playing card having a window with a closed position concealing a respective game symbol group or a respective bonus level qualifier symbol and an open position revealing same; and (f) a master game card including: a bonus level qualified player sign-up area including said bonus level money-match prize amounts printed thereon and a plurality of signature lines each located adjacent to a respective bonus level money-match prize amount;

(i) a bonus prize winner list printed on said master game card and comprising a plurality of said bonus level money-match prize amounts;

(ii) a master game card window having a closed position concealing said bonus prize winner list and an open position revealing same; and (iii) a cumulative bonus prize amount printed on the outside of said master game card window and equaling the sum of said bonus level money-match prize amounts included in said bonus prize winner list.

7. A method of playing a game of chance for monetary prizes, which comprises the steps of:

(a) providing a plurality of individual playing cards each having a group of game symbols printed thereon;

(b) including among said game symbol groups a plurality of winning game symbol groups respectively corresponding to a plurality of instant prize amounts;

(c) including among said game symbol groups a plurality of losing game symbol groups;

(d) including on each individual playing card with a winning game symbol group at least one losing game symbol group and including in said losing game symbol group an instant prize total amount;

(e) covering said game symbol groups on said individual playing cards with windows and concealing said game symbol groups with said windows;

(f) opening said individual playing card windows to reveal said game symbol groups thereunder;

(g) paying to the holders of cards with winning game symbol groups the corresponding instant winner prize amounts represented thereby;

(h) providing a first play level with said game symbol groups on said individual playing cards;

(i) providing a bonus play level with a master game card;

(j) providing a bonus play level sign-up area on said master game card;

(k) printing said bonus level qualifier symbols in said bonus play level sign-up area;

(l) providing signature lines on said master game card in said bonus play level sign-up area adjacent to respective bonus level qualifier symbols;

(m) placing on respective signature lines in said bonus play level sign-up area of said master game card the names or signatures of players holding individual playing cards with respective bonus level qualifier symbols;

(n) providing said master game card with a bonus prize winner list comprising a subset of said bonus level money-match prize amounts;

(o) covering and concealing said bonus prize winner list with a master game card window;

(p) printing on the outside of said master game card window a cumulative bonus prize amount equaling the sum of said bonus level money-match prize amounts in said bonus prize winner list;

(q) opening said master game card window to reveal said bonus prize winner list; and (r) awarding the players holding the corresponding individual playing cards with said bonus level money-match prize amounts corresponding to the bonus level money-match prize amounts on said bonus prize winner list with the corresponding prize amounts.

*8. A game material set for playing a game of chance for monetary prizes, which comprises:*

*(a) a plurality of individual playing pieces each having a group of game symbols printed thereon;*

*(b) said game symbol groups including at least one winning game symbol group corresponding to an instant prize amount and at least one losing game symbol group, said game symbol groups providing a first play level;*

*(c) a plurality of bonus level qualifier symbols each including one of a plurality of bonus level money-match prize amounts, a plurality of said individual playing pieces each having a respective bonus level qualifier symbol printed thereon;*

*(d) each said individual playing piece having a window with a closed position concealing a respective game symbol group or a respective bonus level qualifier symbol and an open position revealing same; and*

*(e) a master game card including:*

*(i) a bonus play level sign-up area including said bonus level money-match prize amounts printed thereon and a plurality of signature lines each located adjacent to a respective bonus level money-match prize amount;*

*(ii) a bonus prize winner list printed on said master game card and comprising a plurality of said bonus level money-match prize amounts;*

*(iii) a master game card window having a closed position concealing said bonus prize winner list and an open position revealing same; and*

*(iv) a cumulative bonus prize amount printed on the outside of said master game card window, said cumulative bonus prize amount equaling the sum of said bonus level money-match prize amounts on said bonus prize winner list.*

*9. The game material set according to claim 8, which includes:*

*(a) said bonus prize winner list comprising a subset of said bonus level money-match prize amounts.*

*10. The game material set according to claim 8, which includes:*

*(a) each said individual playing piece with a bonus level money-match prize amount printed thereon also having a bonus prize icon printed thereon, said bonus level money-match prize amounts and said bonus prize icons collectively forming said bonus level qualifier symbols.*

*11. The game material set according to claim 8, which includes:*

*(a) an instant prize total amount printed on each said individual playing piece including a winning symbol group.*

*12. The game material set according to claim 11, wherein said instant prize total amount is included within a respective game symbol group printed on said individual playing piece.*

*13. A game material set for playing a game of chance for monetary prizes, which comprises:*

*(a) a plurality of individual playing pieces each having a group of game symbols printed thereon;*

*(b) said game symbol groups including a plurality of winning game symbol groups corresponding to respective instant prize amounts and a plurality of losing game symbol groups, said game symbol groups providing a first play level;*

*(c) an instant prize total amount printed on each winning playing piece and representing the total prize amount represented by said winning symbol groups on said piece, each said instant prize total amount being incorporated within a losing game symbol group on said piece*

*(d) a plurality of bonus level qualifier symbols printed on a plurality of respective pieces, each said qualifier symbol including a bonus prize icon and one of a plurality of bonus level money-match prize amounts;*

*(e) each said individual playing piece having a window with a closed position concealing a respective game symbol group or a respective bonus level qualifier symbol and an open position revealing same; and*

*(f) a master game card including: a bonus level qualified player sign-up area including said bonus level money-match prize amounts printed thereon and a plurality of signature lines each located adjacent to a respective bonus level money-match prize amount;*

*(i) a bonus prize winner list printed on said master game card and comprising a plurality of said bonus level money-match prize amounts;*

*(ii) a master game card window having a closed position concealing said bonus prize winner list and an open position revealing same; and*

*(iii) a cumulative bonus prize amount printed on the outside of said master game card window and equalizing the sum of said bonus level money-match prize amounts included in said bonus level prize winner list.*

*14. A method of playing a game of chance for monetary prizes, which comprises the steps of:*

*(a) providing a plurality of individual playing pieces each having a group of game symbols printed thereon;*

*(b) including among said game symbol groups a plurality of winning game symbol groups respectively corresponding to a plurality of instant prize amounts;*

*(c) including among said game symbol groups a plurality of losing game symbol groups;*

*(d) including on each individual playing piece with a winning game symbol group at least one losing game symbol group and including in said losing game symbol group an instant prize total amount;*

*(e) covering said game symbol groups on said individual playing pieces with windows and concealing said game symbol groups with said windows;*

*(f) opening said individual playing piece windows to reveal said game symbol groups thereunder;*

*(g) paying to the holders of pieces with winning game symbol groups the corresponding instant prize amounts represented thereby;*

*(h) providing a first play level with said game symbol groups on said individual playing pieces;*

(*i*) *providing a bonus play level with a master game card;*

(*j*) *providing a bonus play level sign-up area on said master game card;*

(*k*) *printing said bonus level qualifier symbols in said bonus play level sign-up area;*

(*l*) *proving signature lines on said master game card in bonus play level sign-up area adjacent to respective bonus level qualifier symbols;*

(*m*) *placing on respective signature lines in said bonus play level sign-up area of said master game card the names or signatures of players holding individual playing pieces with respective bonus level qualifier symbols;*

(*n*) *providing said master game card with a bonus prize winner list comprising a subset of said bonus level money-match prize amounts;*

(*o*) *covering and concealing said bonus prize winner list with a master game card window;*

(*p*) *printing on the outside of said master game card window a cumulative bonus prize amount equaling the sum of said bonus level money-match prize amounts in said bonus prize winner list;*

(*q*) *opening said master game card window to reveal said bonus prize winner list; and*

(*r*) *awarding the players holding the corresponding individual playing pieces with said bonus level money-match prize amounts corresponding to the bonus level money-match prize amounts on said bonus prize winner list with the corresponding prize amounts.*

* * * * *